US005900168A

United States Patent [19]

Saio et al.

[11] Patent Number: 5,900,168
[45] Date of Patent: May 4, 1999

[54] PLASMA CUTTING METHOD

[75] Inventors: Katsuo Saio; Yoshihiro Yamaguchi, both of Kanagawa-ken, Japan

[73] Assignees: Komatsu Ltd.; Komatsu Industries Corporation, both of Tokyo, Japan

[21] Appl. No.: 08/894,062

[22] PCT Filed: Feb. 13, 1996

[86] PCT No.: PCT/JP96/00304

§ 371 Date: Aug. 12, 1997

§ 102(e) Date: Aug. 12, 1997

[87] PCT Pub. No.: WO96/25265

PCT Pub. Date: Aug. 22, 1996

[30] Foreign Application Priority Data

Feb. 13, 1995 [JP] Japan ...................................... 7-23894

[51] Int. Cl.[6] ..................................................... B23K 10/00

[52] U.S. Cl. ............................... 219/121.44; 219/121.43; 219/121.55; 219/121.57

[58] Field of Search ......................... 219/121.54, 121.55, 219/121.57, 121.59, 121.51, 121.52, 74, 75; 313/231.21, 231.31

[56] References Cited

U.S. PATENT DOCUMENTS

| | | | |
|---|---|---|---|
| 5,414,237 | 5/1995 | Carkhuff | 219/121.51 |
| 5,424,507 | 6/1995 | Yamaguchi | 219/121.44 |
| 5,591,357 | 1/1997 | Couch, Jr. et al. | 219/121.39 |
| 5,653,895 | 8/1997 | Shintani | 219/121.55 |
| 5,653,896 | 8/1997 | Couch, Jr. et al. | 219/121.44 |

FOREIGN PATENT DOCUMENTS

| | | |
|---|---|---|
| 56-39174 | 4/1981 | Japan . |
| 60-55221 | 12/1985 | Japan . |
| 5-174994 | 7/1993 | Japan . |
| 6-71670 | 9/1994 | Japan . |
| 8-288095 | 11/1996 | Japan . |
| 9-24473 | 1/1997 | Japan . |
| 91/16165 | 10/1991 | WIPO . |

OTHER PUBLICATIONS

Patent Abstracts of Japan, vol. 95, No. 6, Jul. 31, 1995 & JP 07060450A (Nippon Steel Corp), Mar. 7, 1995.
Patent Abstracts of Japan, vol. 10, No. 267 (M–516), Sep. 11, 1986 & JP 61 092782A (Koike Sanso Kogyo Co. Ltd), May 10, 1996.
Patent Abstracts of Japan, vol. 13, No. 289 (M–845), Jul. 5, 1989 & JP 01 083376A (Komatsu Ltd), Mar. 29, 1989.

*Primary Examiner*—Mark H. Paschall
*Attorney, Agent, or Firm*—Wenderoth, Lind & Ponack, L.L.P.

[57] ABSTRACT

A plasma cutting method for use in a plasma cutting apparatus having a nozzle with an orifice in which a plasma arc is pinched and thereby narrowed and densified and a flushing secondary gas for surrounding a forward end portion of the nozzle. Also, a non-oxidizing gas is caused to flow as a plasma gas to start the arc and a non-oxidizing gas is caused to flow as the secondary gas to start the arc so that a non-oxidizing gaseous atmosphere may prevail in the vicinity of an outlet of the above mentioned nozzle.

10 Claims, 9 Drawing Sheets

PLASMA CUTTING METHOD

TECHNICAL FIELD

The present invention relates to a plasma cutting method for use with a plasma cutting machine and, more particularly, a plasma cutting method which is rendered capable of preventing an orifice portion of the nozzle from being oxidized and damaged when a cutting process is initiated.

BACKGROUND ART

A plasma torch which has previously been used in a plasma cutting machine is so constructed as shown in FIG. 1 of the drawings attached hereto, and is provided in its central portion with an electrode 1, inside of which there is formed a cooling chamber 8. Also, outside of the electrode 1 there is formed a plasma gas passage 2, and a nozzle 3 is disposed so as to surround the electrode 1 via the plasma gas passage 2. Also, outside of a forward end of the nozzle 3 there are formed a cooling chamber 9 and a secondary gas passage 4 along with a shield cap 5 surrounding the cooling chamber 9 and the secondary gas passage 4.

A cutting process with a plasma torch of such a construction is carried out by generating a plasma arc 7 that constitutes a main arc between the electrode 1 and a workpiece 6 while causing a plasma gas 20 to flow through the plasma gas passage 2. The plasma arc 7 is pinched and thereby narrowed and densified with an orifice 3*a* of the nozzle 3 and is elevated in temperature and accelerated therethrough so as to be flushed towards the workpiece 6 and so as to melt and remove a portion thereof for cutting it.

Then, a water coolant is circulated through the cooling chambers 8 and 9 which are provided in the interior of the electrode 1 and the exterior of the nozzle 3, respectively, so that they may both be cooled. Also, a secondary gas 21 is then flushed through the secondary gas passage 4 provided inside of the shield cap 5 so that the above mentioned plasma arc 7 may be surrounded by the secondary gas 21.

The procedure of generating a plasma arc 7 as mentioned above is set forth below. First, a high frequency voltage is applied across the electrode 1 and the nozzle 3 to cause a spark discharge between them, resulting in the occurrence of a pilot arc. Floating on a flow of the plasma gas 20, the discharge spot of the pilot arc on the side of the electrode 1 is moved to the center of the forward end thereof while the discharge spot on the side of the nozzle 3 passing through the orifice 3*a* thereof is moved to a region of the outlet thereof, eventually reaching the surface of the workpiece 6, and thus establishing a plasma arc 7.

At the same time, the electric power between the electrode 1 and the nozzle 3 ceases being supplied. The plasma arc 7 is then pinched and thereby narrowed and densified with the orifice 3*a* of the nozzle 3 to result in a high temperature and high velocity flushing jet stream, which acts to form a cut groove of a small width in the workpiece 6 and to allow cutting thereof to proceed.

Then, while both the electrode 1 and the nozzle 3 are exposed to an elevated temperature by the plasma arc 7, they are, as mentioned above, cooled by the water coolant or air. Also, the electrode 1 which will be elevated by a temperature of several thousand degrees due to the thermo electron emission, in order for its wear to be lowered, is composed of a high melting point material. Such a material, if the plasma gas 20 contains oxygen, may be hafnium and, if it is a non-oxidizing gas not containing oxygen, may be tungsten.

Also, in a prior art plasma cutting process, the kind of plasma gas 20 that has been employed is related to the material of the workpiece 6. Thus, if a mild steel material is to be cut, the plasma gas 20 makes use of oxygen. If a stainless material or an aluminum material is to be cut, the plasma gas 20 makes use of a non-oxidizing gas not containing oxygen. The non-oxidizing gas may be composed of a single component gas such as argon or hydrogen or a mixture thereof.

By the way, as mentioned earlier, it should be noted that in plasma cutting, a plasma arc 7 at a high temperature and with a high velocity is flushed out of the nozzle 3, thereby locally melting a workpiece 6 and a portion of the molten metal thereof is blown off to form a cut groove therein, whereby the workpiece 6 continues to be cut.

Accordingly, it can be seen that the cutting quality of plasma cutting significantly depends on the configuration of the nozzle 3 through which the plasma arc 7 is pinched and thereby narrowed and densified for flushing out thereof. If the nozzle 3 wears so as to be deformed in configuration and the orifice 3*a* thereof is enlarged in diameter, the cutting quality should deteriorate.

Since the outlet of the orifice 3*a* of the nozzle 3 in particular largely affects the direction and the expansion of the plasma arc 7 flushed out therethrough, it should be noted that if the outlet of the orifice 3*a* wears even a little, the cut surface of the workpiece 6 will incline, the molten metal will become unable to be blown off completely and there will be left what is called a dross—a residue of the molten metal in a cut groove, and all of these deleteriously affects the cutting quality largely.

Also, as mentioned earlier, it should be noted that a plasma cutting machine in the prior art is designed to generate a pilot arc between the electrode 1 and the nozzle 3 before a main arc is initiated and, if an electrical conduction is established between the electrode 1 and a workpiece 6 with the pilot arc as a pilot flame, to form a plasma arc 7 constituting the main arc, and then, if this occurs, the supply of the electric power to the nozzle 3 is ceased so as to terminate the pilot arc. Thereafter, cutting will proceed with the main arc.

Therefore, with the plasma cutting machine, if a cutting operation is performed with such a main arc generated, such a pilot arc comes to be generated each time the arc is initiated.

Since the pilot arc is generated between the electrode 1 and the nozzle 3 as shown in FIG. 2 of the drawings, the spot (arcing spot) P sustaining the pilot arc 17 is exposed to the arc of a high temperature. Also, an air entraining flow 18 is produced in the vicinity of the forward end of the nozzle 3 such that air may be drawn so as to flow into the orifice 3*a* of the nozzle 3. For this reason, if the plasma gas is composed of a non-oxidizing gas, damage 19 may develop due to oxidation in the orifice 3*a* of the nozzle 3. Consequently, each time a cutting operation is carried out, the wear of the nozzle 3 unavoidably proceeds due to a pilot arc 17 which is generated when the arc is initiated.

The pilot arc 17 is generated from a spark discharge that is caused when, initially at the start of an arc, a high frequency high voltage is applied across the electrode 1 and the nozzle 3. The pilot arc 17 is generated across the shortest distance between the electrode 1 and the nozzle 3. Subsequently, floating on a flow of the plasma gas 20, the arcing spot on the side of the electrode 1 is moved to the center of the forward end thereof whereas the arcing spot P on the side of the nozzle 3 passing through the orifice 3*a* thereof is moved to a region of the outlet of the nozzle orifice 3*a*, and then stays in the vicinity of the outlet thereof until a main arc is generated.

Therefore, as shown in FIG. 2, it follows that the wear of the nozzle 3 when the pilot arc is generated is concentrated and proceeds at a portion of the outlet of the orifice 3*a*.

Thus, in the conventional plasma cutting machine, since a pilot arc is started each time a cutting process is carried out, the outlet portion of the orifice 3*a* of the nozzle 3, which largely affects the cutting quality, predominantly and continually wears off, it is unavoidable that the cutting quality will deteriorate. In order to maintain an acceptable level of cutting quality, therefore, it has been necessary to frequently exchange the nozzle 3.

Also, in cutting a mild steel material, it should be noted that the use of oxygen or a gas containing oxygen as the plasma gas 20 is customary but, as compared with a non-oxidizing gas, wear of the nozzle 3 due to a pilot arc is made further acute and requires the nozzle 3 to be replaced after only cutting operation time of several hours to several tens of hours. Thus, the need to enhance the durability of the nozzle 3 has been a big problem.

Thus, the requirement to replace the nozzle so often not only raises costs and the machine's running cost but also deteriorates the cutting efficiency arising from the time required to replace it, resulting in lowered machine productivity. Also, these are not all the deficiencies. Not only is personnel required who constantly monitors a reduction in the cutting quality due to a deterioration of the nozzle 3, but also an acute wear of the nozzle 3 constitutes a severe obstruction to the construction of an unmanned plasma cutting machine.

The present invention has been made with the foregoing problems taken into account and has as its object to provide a plasma cutting method which is capable of markedly enhancing the durability of the nozzle, maintaining an acceptable cutting quality over a prolonged time period, reducing the machine's running cost, and realizing an enhancement of the machine's productivity.

SUMMARY OF THE INVENTION

In order to achieve the above mentioned objects, there is provided a plasma cutting method for use with a plasma cutting apparatus having a nozzle with an orifice whereby a plasma arc is pinched and thereby narrowed and densified and a secondary gas flushing means for delivering a secondary gas so as to surround a forward end portion of the nozzle.

In particular, a non-oxidizing gas is caused to flow as a plasma gas to start the arc and a non-oxidizing gas is caused to flow as the secondary gas to start the arc so that a non-oxidizing gaseous atmosphere may prevail in the vicinity of an outlet of the nozzle.

According to the construction mentioned above in which a non-oxidizing gas is caused to flow as a plasma gas to start the arc, a secondary gas to start the arc is flushed so as to surround the orifice of the nozzle outside thereof so that the atmosphere may not be drawn into to the orifice and the secondary gas is also constituted by a non-oxidizing gas without oxygen as is the plasma gas to establish the state in which oxygen is not existent in the vicinity of the orifice of the nozzle, it can be seen that the wear of the orifice of the nozzle will largely be reduced.

In the construction mentioned above, the plasma gas may be switched from the non-oxidizing gas to oxygen or a gas that contains oxygen, substantially concurrently with a shift from a pilot arc into a main arc.

In the case mentioned above, it is desirable that the step of switching the plasma gas should be effected when the pilot arc is generated.

Also, in the construction mentioned above, the secondary gas may be switched from the non-oxidizing gas to oxygen or a gas that contains oxygen, substantially concurrently with a shifting from the pilot arc to the main arc.

In the case mentioned above, it is desirable that the steps of switching the plasma gas and switching the secondary gas should be both effected when the pilot arc is generated or when the main arc is generated.

Further, in the construction mentioned above, the non-oxidizing plasma gas and secondary gas, which are caused to flow when the arc is started, may both be nitrogen. Also, the plasma gas, which is caused to flow substantially when and after the pilot arc is shifted into the main arc and while a cutting process is continued, may be oxygen and the secondary gas may then be air or a mixed gas of oxygen and nitrogen.

Also, in the construction mentioned above, the plasma gas, which is caused to flow substantially when and after pilot arc is shifted into a main arc and while a cutting process is continued, may be a non-oxidizing gas.

Also, in the construction mentioned above, the secondary gas that is caused to flow substantially when and after the pilot arc is shifted into the main arc may be a non-oxidizing gas.

Further, it is desirable that the plasma gas and the secondary gas should both be nitrogen.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

DETAILED DESCRIPTION OF THE INVENTION

Hereinafter, suitable embodiments of the present invention with respect to a plasma cutting method will be set forth with reference to the accompanying drawings hereof.

An explanation will now be given of a certain embodiment of the plasma cutting method according to the present invention.

Figure 1:
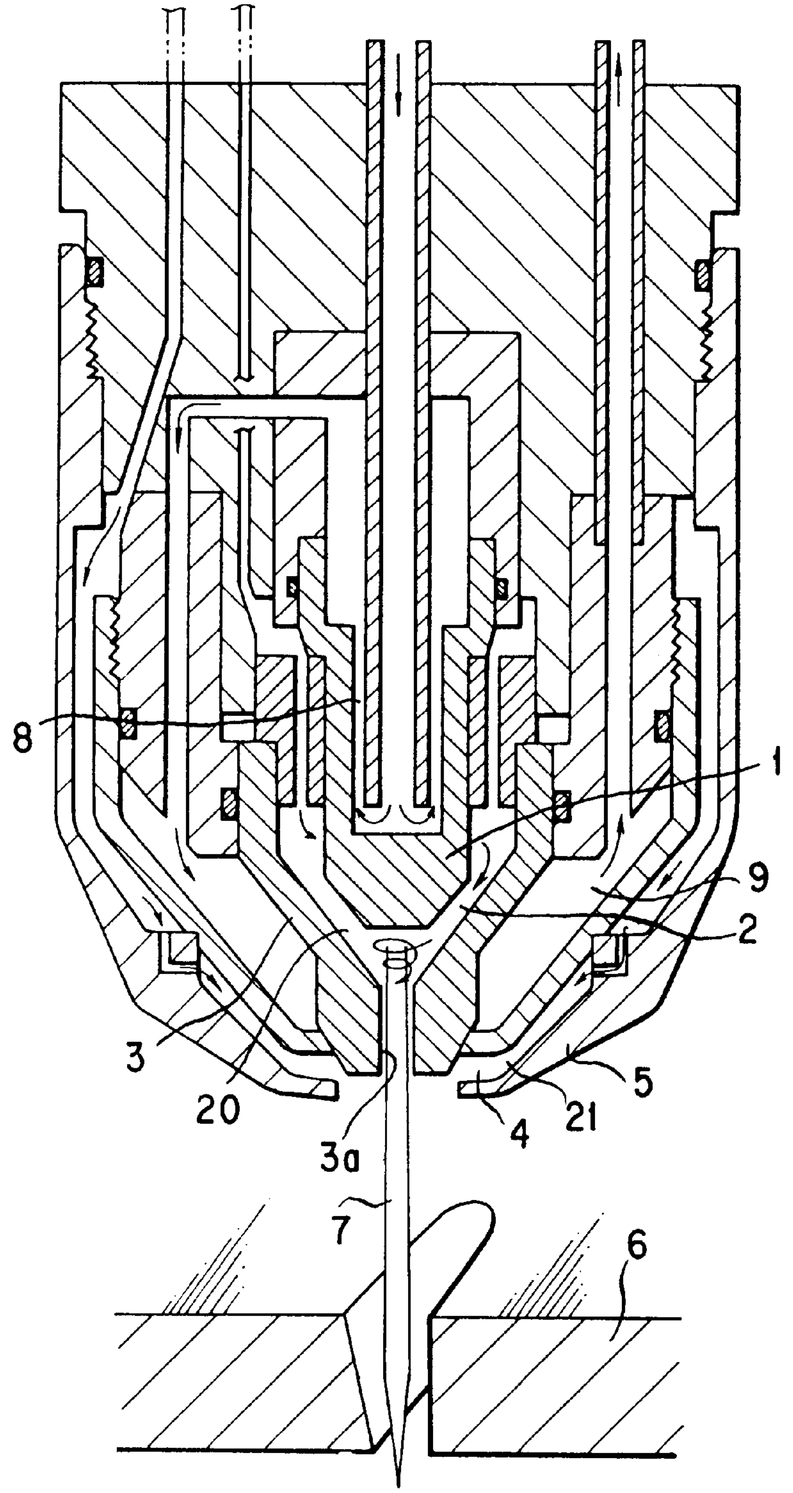
FIG. 1 is a cross sectional view that shows an example of the plasma torch for use in a plasma cutting method of the prior art.
Figure 2:
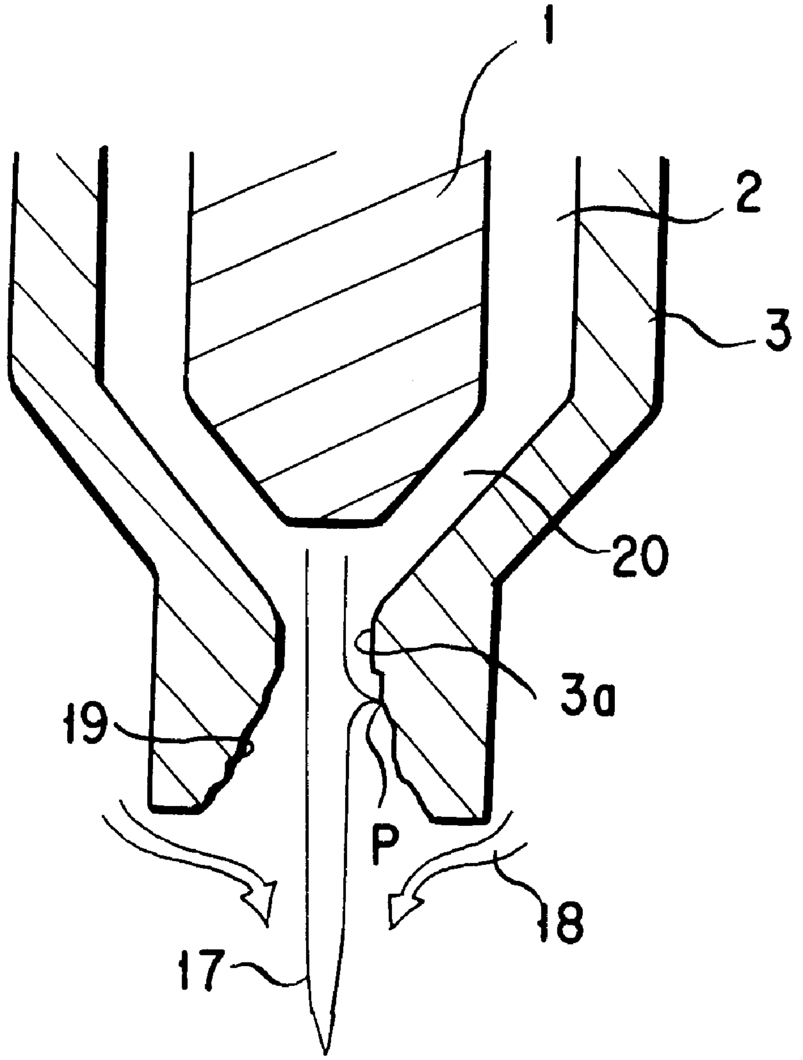
FIG. 2 is a cross sectional view that shows the state in which a nozzle is wearing off due to a pilot arc when an arc is initiated in the plasma cutting method of the prior art.
Figure 3:
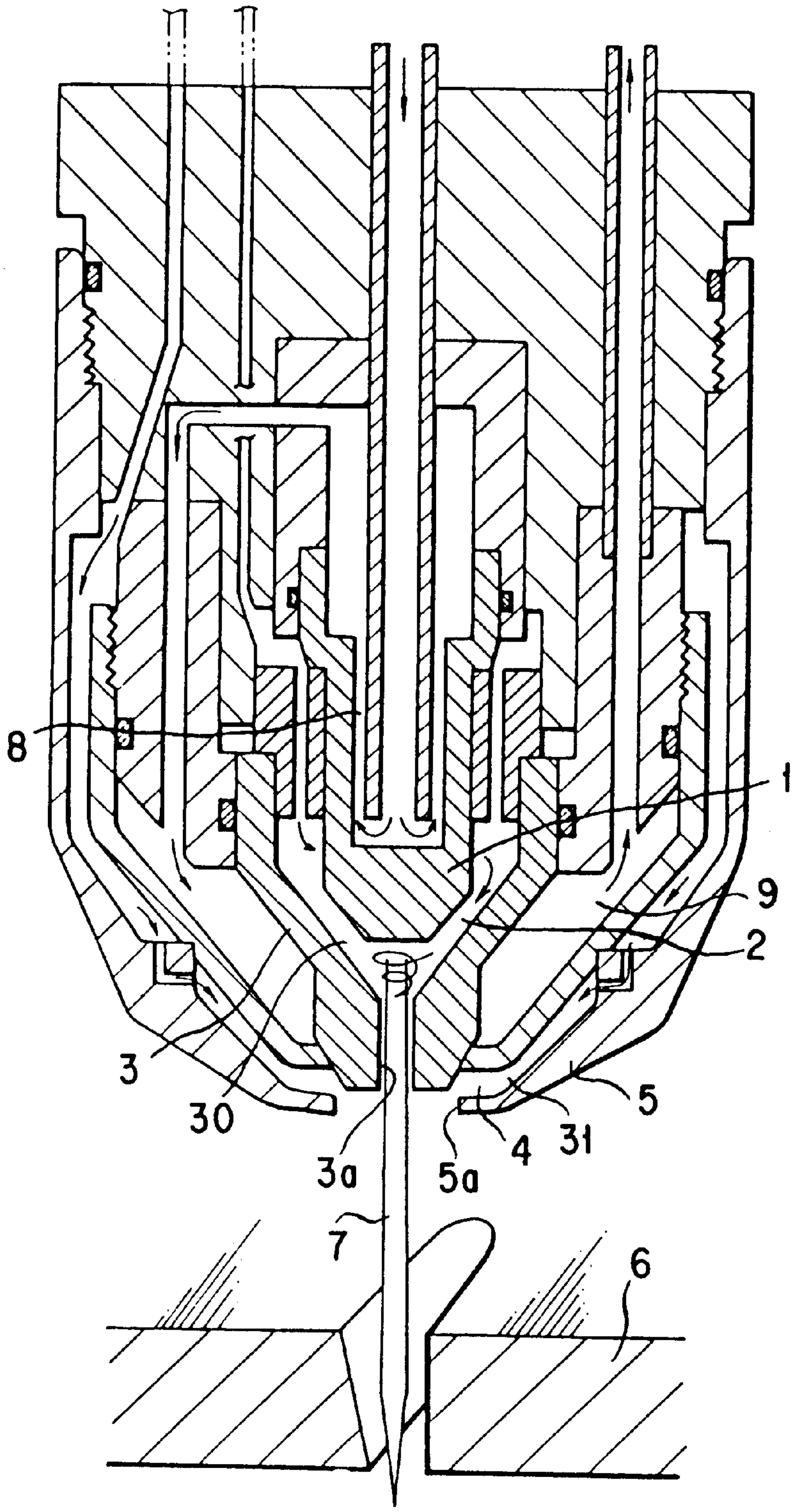
FIG. 3 is a cross sectional view that shows an example of the plasma torch for use in a plasma cutting method according to the present invention.

The method according to the present invention is carried out by using a plasma torch of a typical construction as shown in FIG. 3.

According to the method of the present invention, it should be noted that in order for a pilot arc to be generated when an arc for a plasma cutting process is initiated, a non-oxidizing gas not containing oxygen is caused to flow as a plasma gas 30, and a secondary gas 31 which is a non-oxidizing gas without oxygen is also caused to flow and be discharged outside of a nozzle 3 so as to surround an orifice 3*a* so that the atmosphere may not be the atmosphere may not be drawn into the plasma gas. Thus, by establishing the state in which oxygen may not be existent in the vicinity of the orifice 3*a* of the nozzle 3, the wear of the orifice 3*a* of the nozzle 3 can be largely reduced.

The experimentation conducted by the present inventors in order to demonstrate the above mentioned effect as well as the experimental results are set out below.

In this experimentation, the plasma torch used had a secondary gas supply means for delivering a secondary gas so as to surround a forward end portion of the nozzle. By repetitively igniting a pilot arc, the orifice of the nozzle was permitted to continue to wear off. Then, the weights of the nozzle, composed of copper and having an orifice diameter of 2.8 mm, before and after the experiment were measured and a decrease in such weight was regarded as the nozzle orifice wear.

Also, the kinds of plasma gas and secondary gas were selected in combinations listed below.

(1) The plasma gas is oxygen, and the secondary gas is air.

(2) The plasma gas is nitrogen, and the secondary gas is air.

(3) The plasma gas is nitrogen, and the secondary gas is nitrogen.

The operating conditions were as follows:

The plasma gas had a pressure of 2.0 kg/cm$^2$ and the secondary gas had a pressure of 3.5 kg/cm$_2$ with a current value of 50 amperes, an arcing number of 50 times and an arcing time duration of 3 seconds.

The measured values of the wear of the nozzle orifice which were obtained as the experimental results are listed in Table 1 below.

TABLE 1

| | (1) | (2) | (3) |
|---|---|---|---|
| Plasma gas | oxygen | nitrogen | nitrogen |
| Secondary gas | air | air | nitrogen |
| Nozzle wear [×10 mg] | 7.1 | 1.3 | 0.1 |

From the results shown in Table 1 above, it can be seen that if the plasma gas contains oxygen, the wear of the nozzle orifice due to a pilot arc is very acute. Also, if the plasma gas is constituted by a gas not containing oxygen (here, nitrogen), the wear of the nozzle orifice is considerably reduced, but it is still unavoidable that the wear proceeds to an extent that it affects the cutting quality. Further, the plasma gas and the secondary gas are each constituted of a gas not containing oxygen (here, nitrogen), there is almost no continuing wear of the nozzle orifice.

From the above mentioned experimental results, it has been proved that the wear of the nozzle orifice is largely related to the presence of oxygen.

More specifically, if oxygen is existent in the vicinity of the nozzle orifice, it has been proved that not only is the arcing spot of a pilot arc melted due to the fact that it is at an elevated temperature, but also it is continually oxidized under such a high temperature condition and that the oxidation of the nozzle orifice is a predominant cause of its wear.

Also, while oxygen, which causes the oxidation of the nozzle orifice, contained in the plasma gas is naturally furnished therefrom, this is not the only source of oxygen. Thus, if the nozzle orifice is exposed to the atmosphere (air), it has been proved that a plasma arc stream that is flushed at a high velocity out of the nozzle orifice acts to draw in air from the atmosphere along the nozzle orifice, and therefore oxygen in the atmosphere as well can cause oxidation and also causes nozzle orifice wear to proceed.

Accordingly, as in the method of the present invention in which a non-oxidizing gas, not containing oxygen, is caused to flow as the plasma gas for starting a plasma cutting arc, and the secondary gas which is a non-oxidizing gas as is the plasma gas without oxygen is also caused to flow and be discharged outside of the nozzle so as to surround the orifice so that the atmospheric air is not drawn into the plasma gas and so that oxygen is not present in the vicinity of the nozzle orifice, the wear of the orifice of the nozzle can be largely reduced.

In a method as mentioned above, the secondary gas 31 functions to shield a plasma gas stream, which contributes to a cutting process, from the atmosphere, that is, the secondary 31 serves to shield the outlet of the nozzle 3 from the atmosphere so that the plasma arc 7 is pinched and thereby narrowed and densified, and whose dimensional accuracy decisively affects the cutting quality.

In this case, the forward end portion of a shield cap 5, that constitutes or defines a secondary gas passage 4, is so configured that as shown in FIG. 3, it may generally be tapered towards the torch forward end side and may thus be able to better shield the nozzle forward end portion efficiently with the secondary gas 31. Then, so that with the aid of the secondary gas 31 there may be no disturbance in the plasma arc 7 which is flushed out of the nozzle 3, the nozzle 3, an opening portion 5*a* of the shield cap 5 must have a diameter that is greater than that of the orifice 3*a* of the nozzle 3.

Figure 4:
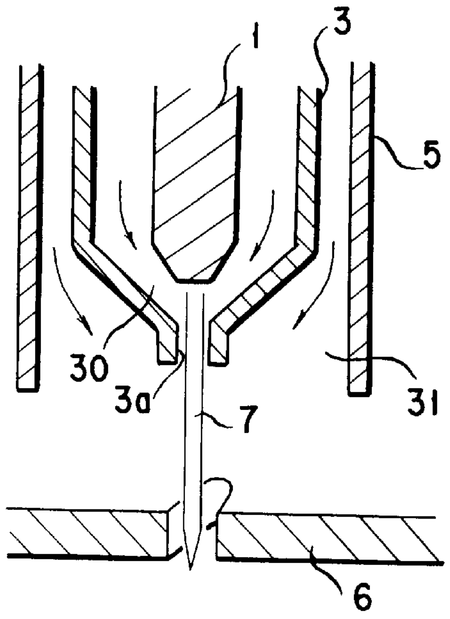
FIG. 4 is a cross sectional view that shows another example of the plasma torch for use in the plasma cutting method according to the present invention.
Figure 5:
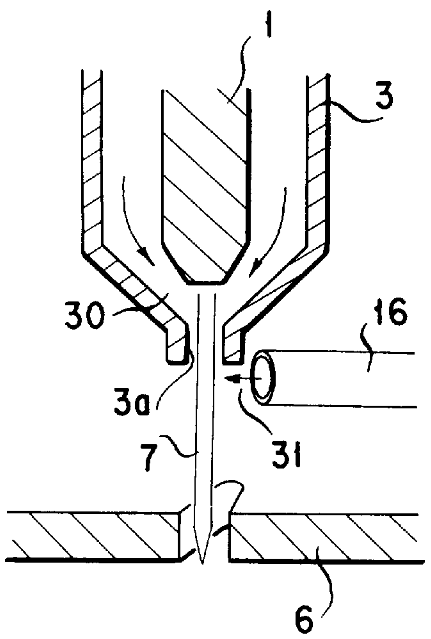
FIG. 5 is a cross sectional view that shows still another example of the plasma torch for use in the plasma cutting method according to the present invention.

It should be noted at this point that other examples of the means for flushing the said secondary gas 31 include one in which the shield ca[ 5 is made cylindrical as shown in FIG. 4 and in which as shown in FIG. 5 the outlet of the nozzle 3 has a secondary gas flushing nozzle 16 located at a side thereto which is adapted to laterally discharge a secondary gas 31 against the outlet and thereby to shield the latter from the atmosphere.

Figure 6:
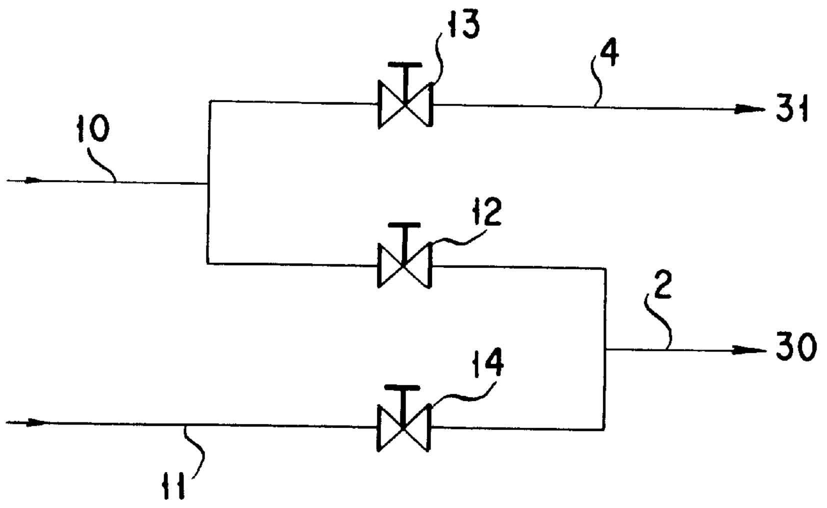
FIG. 6 is a circuit diagram that shows a gas supply circuit for use where only a plasma gas is switched in the practice of the method according to the present invention.
Figure 7:
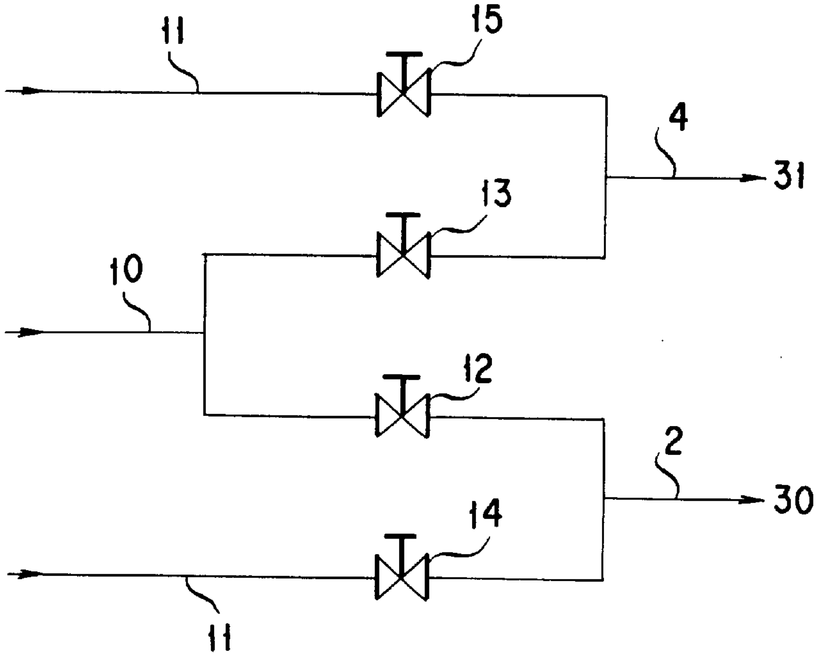
FIG. 7 is a circuit diagram that shows a gas supply circuit for use where both the plasma gas and a secondary gas are switched in the practice of the method according to the present invention.

Next, it may be noted that a supply circuit for the plasma gas 30 and the secondary gas 31 for carrying out the method according to the present invention is constructed as shown in FIG. 6 or 7.

It should be noted here that the circuit includes a non-oxidizing gas supply circuit 10 and an oxidizing supply circuit 11.

In the circuit of FIG. 6, only the plasma gas 30 is designed to be switched. In order to completely replace the gas within the supply circuit before a plasma arc is generated, an arc initiating plasma gas on/off valve 12 will be opened to cause a non-oxidizing gas to flow as the plasma gas 30 in a plasma gas passage 2 whereas a secondary gas on/off valve 13 will be opened to cause a non-oxidizing gas to flow as the secondary gas 31 through the secondary gas passage 4 for a predetermined time interval before a pilot arc is generated. This will establish the state in which no oxygen is existent in the vicinity of the outlet of the nozzle 3, in which state an arc is initiated by generating a pilot arc. After the pilot arc has been generated, the arc initiating plasma arc gas on/off valve 12 will be closed and at the same time a cutting plasma gas on/off valve 14 will be opened to switch the plasma gas from the non-oxidizing gas to oxygen or a gas that contains oxygen. Then, by permitting the latter to flow, a cutting operation will be initiated.

Figure 8:
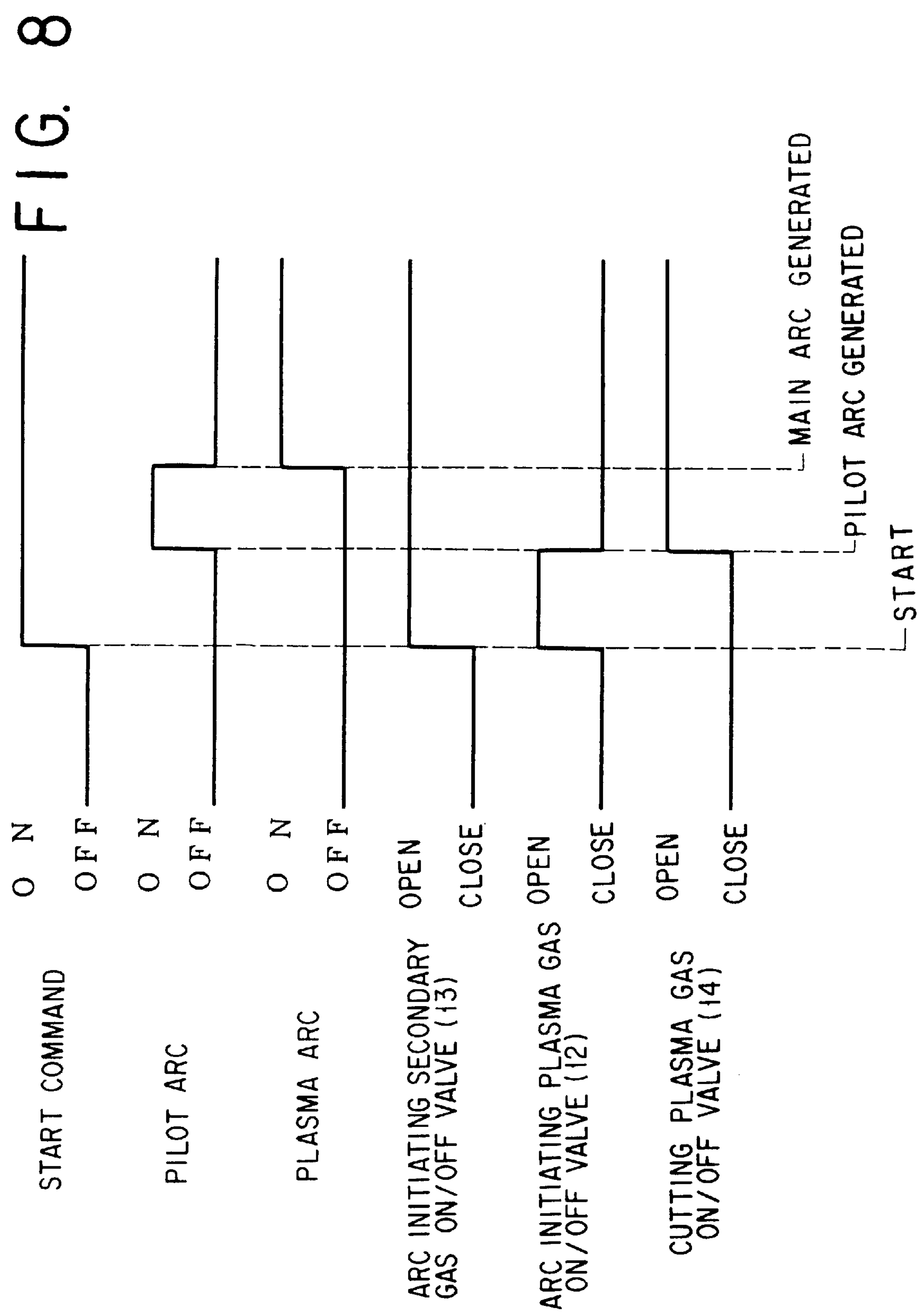
FIG. 8 is a timing diagram that shows an example of the operation for use where only the plasma gas is switched in the practice of the method according to the present invention.
Figure 9:
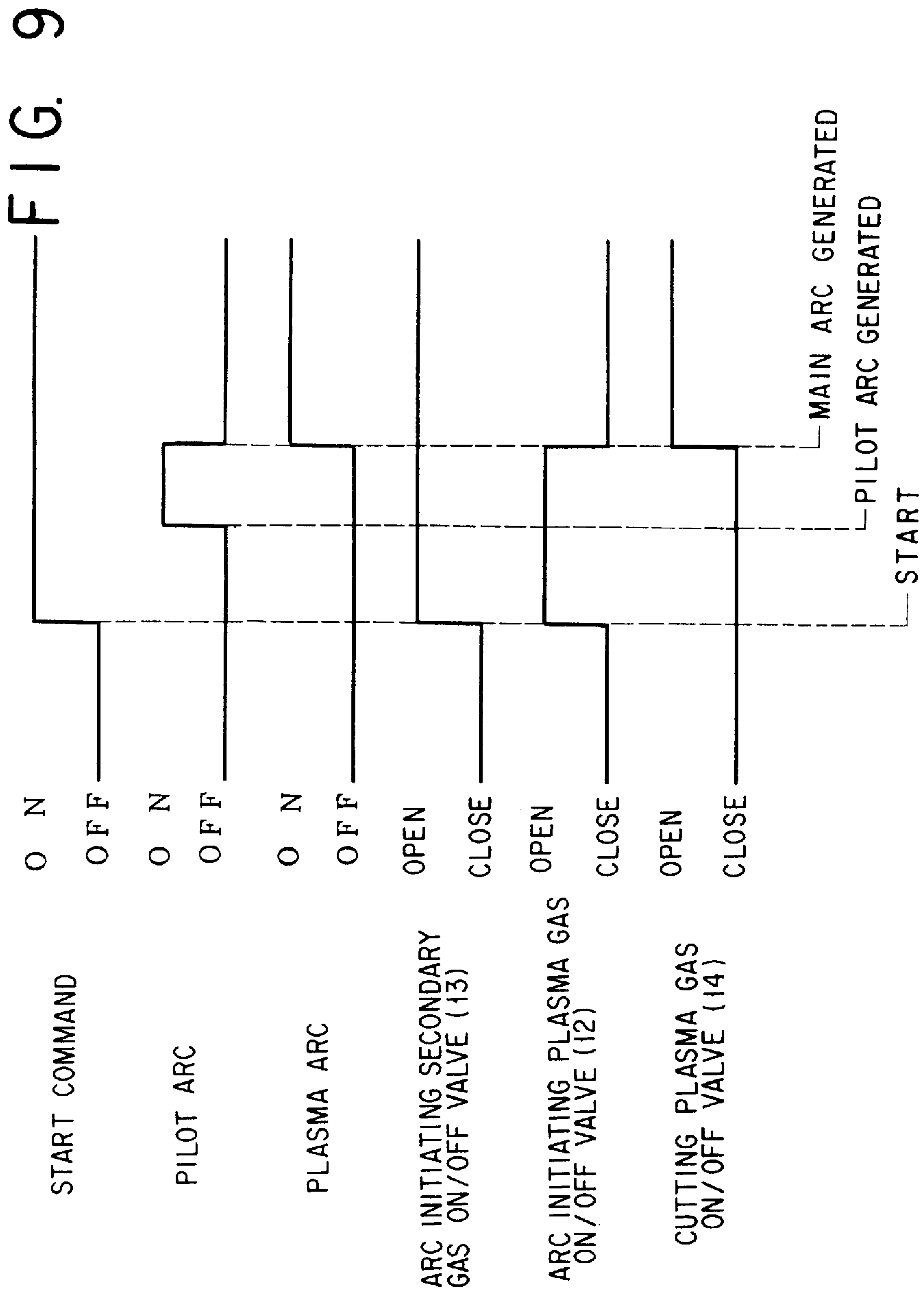
FIG. 9 is a timing diagram that shows another example of the operation for use where only the plasma gas is switched in the practice of the method according to the present invention.

The timing diagram for the switching steps which are then performed is shown in FIG. 8 or 9. In the circuit of FIG. 8 the concurrent switching steps for both the valves 12 and 14 are effected when a pilot arc is generated. In the circuit of FIG. 9 the concurrent switching steps for both the valves 12 and 14 are effected when a main arc is generated.

Also, in the case of FIG. 7, both the plasma gas 30 and the secondary gas 31 are designed to be switched, in order to completely replace the gases within the circuits before a plasma arc is generated, a predetermined time interval before the arc is initiated the arc initiating plasma gas on/off valve 12 will be opened to cause a non-oxidizing gas to flow as the plasma gas 30 through the plasma gas passage 2 whereas the arc initiating secondary gas on/off valve 13 will be opened to cause a non-oxidizing gas to flow as the secondary gas 31 through the secondary gas passage 4, to establish the state in which no oxygen is existent in the vicinity of the outlet of the nozzle 3, in which state a pilot arc is generated to initiate an arc. After the pilot arc has been generated, the arc initiating plasma gas on/off valve 12 will be closed and at the same time the cutting plasma gas on/off valve 14 will be opened to switch the plasma gas 30 from the non-oxidizing gas to oxygen or a gas that contains oxygen. Then, the arc initiating secondary gas on/off valve 13 will be closed and at the same time a cutting secondary gas on/off valve 15 will be opened to switch the secondary gas 31 from the non-oxidizing gas to oxygen or a gas that contains oxygen. Then, by permitting the latter to flow, a cutting operation commences.

Figure 10:
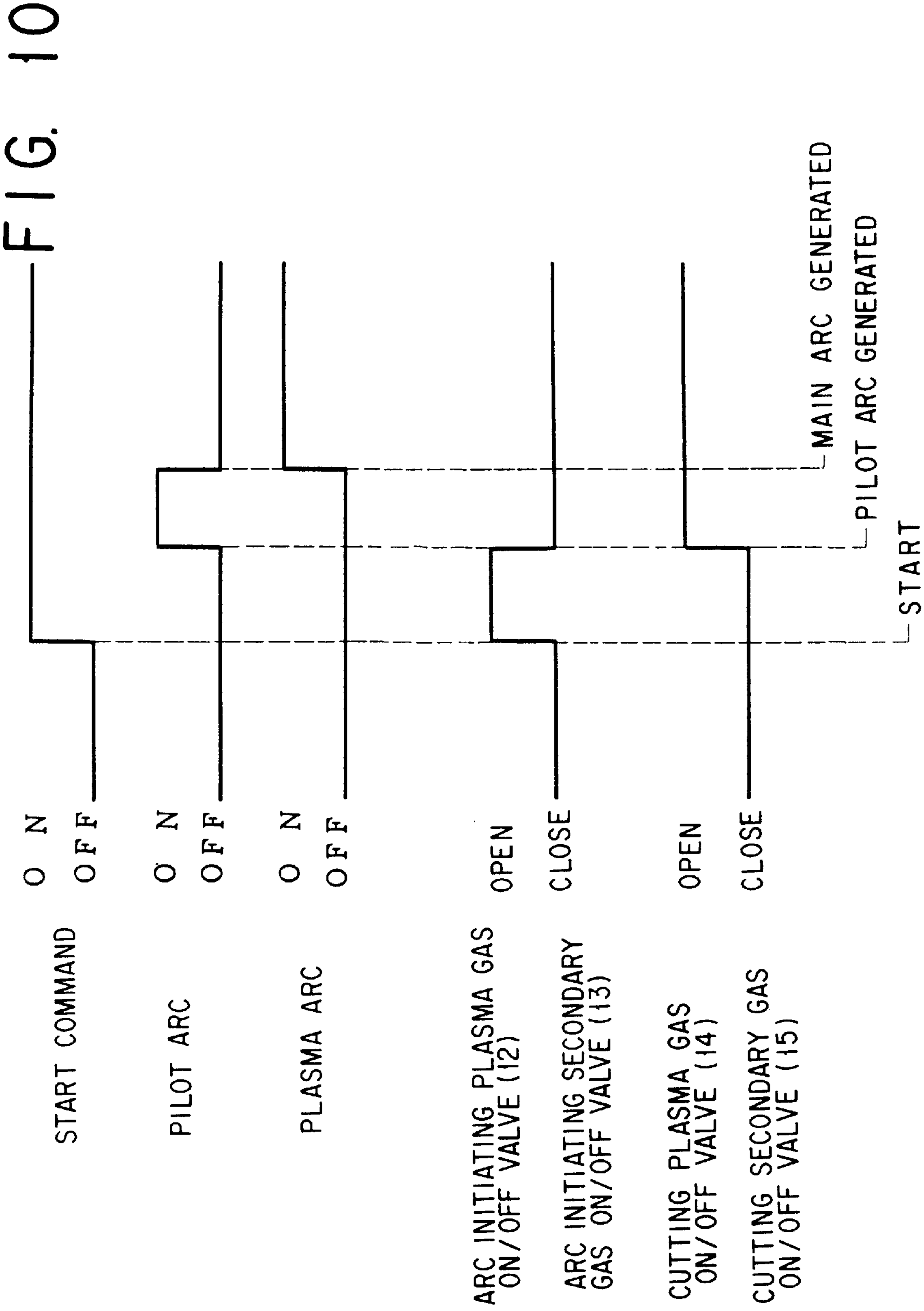
FIG. 10 is a timing diagram that shows an example of the operation for use where both the plasma gas and the secondary gas are switched in the practice of the method according to the present invention.
Figure 11:
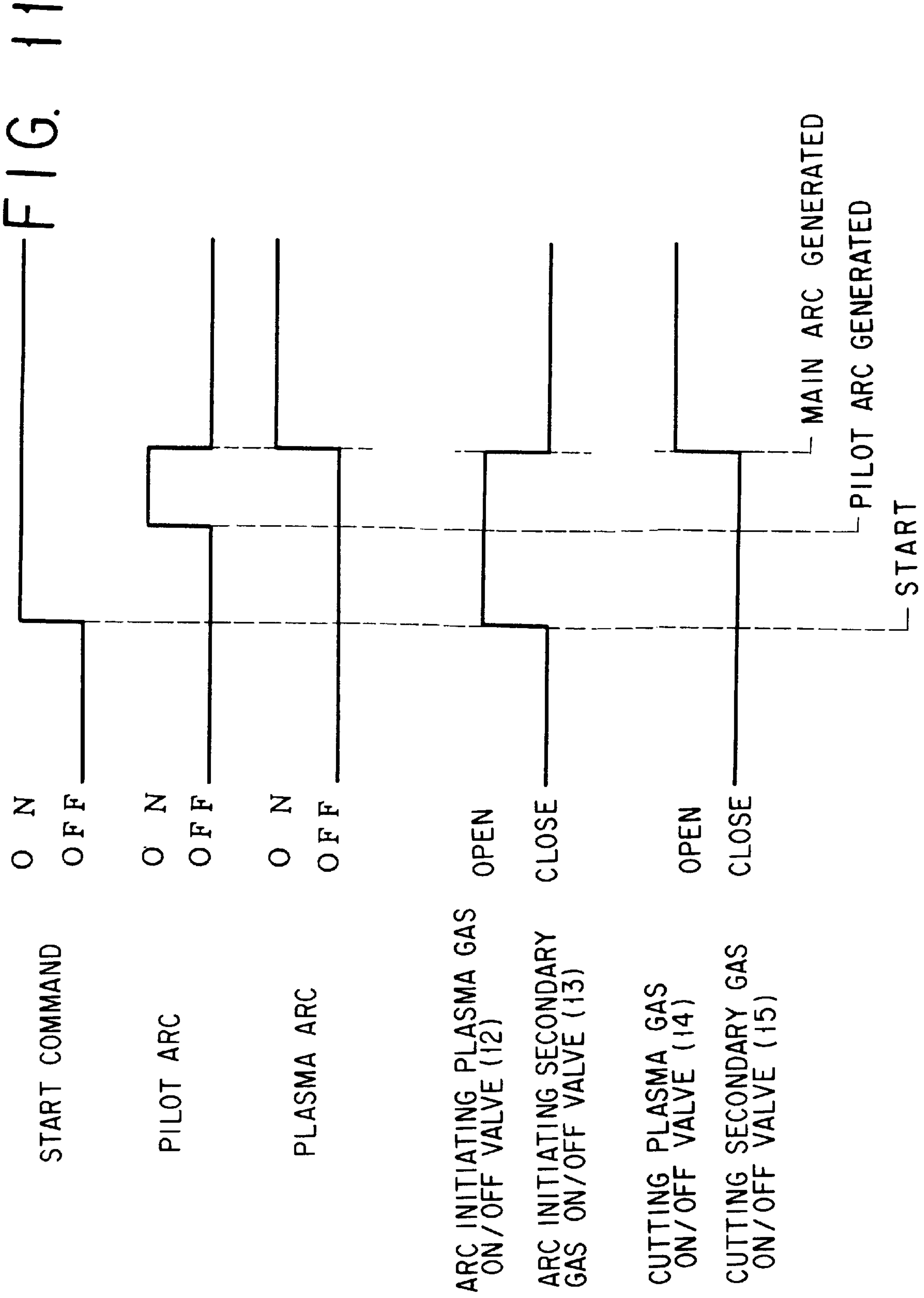
FIG. 11 is a timing diagram that shows another example of the operation for use where both the plasma gas and the secondary gas are switched in and the secondary gas are switched in the practice of the method according to the present invention.

The timing diagram for the switching steps which are then performed for both the gases 30 and 31 is shown in FIG. 10 or 11. In the circuit of FIG. 10, the concurrent switching steps for all the valves 12, 13, 14 and 15 are effected when a pilot arc is generated. In the circuit of FIG. 11, the concurrent switching steps for all the valves 12, 13, 14 and 15 are effected when a main arc is generated.

The time at which each of the plasma and secondary gases is switched represents the time at which a signal is received that is produced when the occurrence of the pilot arc or the occurrence of the main arc is detected.

Also, a time at which a gas is switched should better be established with the time of replacement of a initiating non-oxidizing gas and a cutting oxidizing gas at the orifice portion of the nozzle 3 taken into consideration. Desirably the replacement should be completed at the orifice portion of the nozzle 3 at the same time as a main arc occurs and then it would have no adverse influence on a cutting operation. However, the time period required for the replacement to be completed would actually be longer or shorter depending on the length of a gas piping. Therefore, if the gas piping length is so short that a gas which has passed an on/off nozzle may promptly arrive at the orifice portion of the nozzle 3, the time at which a gas is switched may be when a signal indicating the occurrence of a main arc is received. Also, if the gas piping length is so long that it takes longer to replace a gas, it may be an extended time before a main arc is generated. An influence of gas replacement on a cutting process could be held at a minimum if the timing of a gas switching step is so established when the time interval for the gas replacement is short in sequence so that any of a pilot arc occurrence sensing signal, a high frequency occurrence sensing signal and a start signal may be detected to switch the relevant on/off valve.

It should be noted at this point that in the method of the present invention, although it has been shown that a gas is switched when a pilot arc is generated and while a cutting process is continued, it would further be desirable that a non-oxidizing gas should be permitted to flow for a given time interval again after the cutting process has been completed as when the pilot arc was generated, and then the gas piping will be filled with the non-oxidizing gas. If this has been done, the time period required for the non-oxidizing gas to be allowed to flow will be shortened when the arc is then to be re-started and thus when the gas is again to be replaced within the gas piping. This allows the next cutting operation to be initiated more promptly and a series of plasma cutting operations to be performed with an increased efficiency.

In the method of the present invention, an oxidizing gas is represented by oxygen, air or a gas that contains oxygen such as a mixed gas of oxygen and nitrogen whereas a non-oxidizing gas is represented by a so-called inert gas such as nitrogen, argon, helium and hydrogen singly or in combination.

Where a mild steel material is to be cut by plasma cutting, it is customary to make use of oxygen as the plasma gas 30. In this case, nitrogen is utilized both as the plasma gas 30 and the secondary gas 31 when an arc is started, and oxygen is utilized as the plasma gas 30 and air or a gas containing oxygen is utilized as the secondary gas 31 after a pilot arc has been generated and while a cutting process proceeds.

It should be noted here that oxygen is utilized as the plasma gas 30 for cutting because the cutting is promoted by a heat of reaction that is produced from the oxidation reaction between mild steel and an oxygen plasma. Also, in this case the secondary gas 31 should be desirably a gas that contains oxygen. This is because if a non-oxidizing gas were utilized the oxygen purity of the plasma gas 30 would, be lowered and would exert a deleterious effect on plasma cutting. Also, the reason why nitrogen is utilized as the non-oxidizing gas when a pilot arc is generated is that, it if made into a plasma, it would have characteristics which are substantially identical to those of oxygen and would make the arc less unstable when it is switched.

Also, when a stainless steel material or an aluminum material is to be cut, a non-oxidizing gas not containing oxygen is utilized as the plasma gas 30. The non-oxidizing gas includes nitrogen, argon, hydrogen and so forth singly or in a combination. In this case as well, the nozzle wear due to a pilot arc as mentioned above should proceed although it is much less than with the oxygen plasma. For this reason, in a plasma cutting machine using such a non-oxidizing gas, it will be seen that the durability of the nozzle 3 can be enhanced by causing a non-oxidizing secondary gas 31 to flow when a pilot arc is generated.

The operational effects which can be achieved according to the present invention are set forth below.

(1) The orifice of the nozzle 3 can be shielded from the atmosphere when an arc is initiated, thus preventing it from being oxidized and damaged.

(2) Although a non-oxidizing gas is caused to flow when an arc is started, since it is switched to an oxidizing gas which is caused to flow in a cutting process, there can be no deterioration of its cutting quality.

(3) As a result of preventing the oxidizing damage, a favorable cutting quality can be maintained for a prolonged time period. In other words, an enhancement of the durability for the nozzle 3 can be achieved.

(4) owing to the enhancement of the durability for the nozzle 3, its replacement in number is reduced, thus reducing the operator's labor.

(5) The reduction in the number of replacement of the nozzle 3, i.e., a prolonged replacement cycle time therefor, results in an enhanced contribution to the construction of an unmanned plasma cutting machine.

(6) The loss of time required to replace the nozzle 3 is eliminated, thus enhancing the cutting efficiency.

(7) Since the purchasing cost for the nozzle 3 is lowered, it is expected to reduce the machine's running cost.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof can be made within the scope with respect to the features specifically set forth in the appended claims and encompasses all the equivalents thereof.

What is claimed is:

1. A method for operating a plasma cutting apparatus which includes a nozzle having an orifice, wherein a plasma arc, initiated by a pilot arc and sustained by a main arc, is pinched and densified through the nozzle orifice; and a secondary gas flushing means for delivering a secondary gas so as to envelope the plasma arc while surrounding a forward end portion of the nozzle, said method comprising:

flushing said nozzle orifice with a non-oxidizing gas, which functions as a plasma forming gas for initiating said plasma arc;

delivering a non-oxidizing gas as said secondary gas in initiating the plasma arc so that a non-oxidizing gaseous atmosphere prevails in the vicinity of an outlet of said nozzle, thereby minimizing wear of said nozzle in a region of said outlet; and switching said plasma forming gas from said non-oxidizing gas to a gas containing oxygen, substantially concurrently with said pilot arc shifting into said main arc.

2. The method as claimed in claim 1, wherein said gas switching operation is effected when said pilot arc is developed.

3. The method as claimed in claim 1, wherein said gas switching operation is effected when said main arc is developed.

4. The method as claimed in claim 1, further comprising switching said secondary gas from said non-oxidizing gas to a gas containing oxygen, substantially concurrently with said pilot arc shifting into said main arc.

5. The method as claimed in claim 1, further comprising switching said secondary gas from said non-oxidizing gas to a gas containing oxygen, wherein said plasma gas switching operation and said secondary gas switching operation are effected when said pilot arc is developed.

6. The method as claimed in claim 1, further comprising switching said secondary gas from said non-oxidizing gas to a gas containing oxygen, wherein said plasma gas switching operation and said secondary gas switching operation are effected when said main arc is developed.

7. The method as claimed in claim 4, wherein said plasma forming gas and said secondary gas are 1) both nitrogen when said plasma gas is initiated and 2) oxygen and air or a mixed gas of oxygen and nitrogen substantially when and after said pilot arc is shifted into said main arc.

8. The method as claimed in claim 4, wherein said non-oxidizing plasma-forming and secondary gases are both nitrogen.

9. A method for operating a plasma cutting apparatus, said method comprising:

flushing a plasma gas supply circuit with a non-oxidizing gas which functions as a plasma gas;

delivering a secondary gas which is a non-oxidizing gas, through a secondary gas passage, to an area adjacent an outlet of a nozzle so that no oxygen is present in the vicinity of the nozzle outlet;

generating a pilot arc to initiate a plasma arc which is enveloped by said secondary gas; and switching said plasma gas from the non-oxidizing gas to a gas which contains oxygen, wherein the plasma gas is switched substantially concurrently with the shifting of the pilot arc into a main arc.

10. The method as claimed in claim 9, wherein said non-oxidizing plasma-forming gas and said non-oxidizing secondary gas are both nitrogen.

* * * * *